(12) United States Patent
Kilper et al.

(10) Patent No.: US 11,496,213 B2
(45) Date of Patent: Nov. 8, 2022

(54) FAST PROBING OF SIGNAL QUALITY IN A WDM NETWORK

(71) Applicants: Arizona Board of Regents on Behalf of the University of Arizona, Tucson, AZ (US); THE TRUSTEES OF COLUMBIA UNIVERSITY IN THE CITY OF NEW YORK, New York, NY (US)

(72) Inventors: Daniel Kilper, Tucson, AZ (US); Atiyah Sayyidah Ahsan, New York, NY (US); Keren Bergman, New York, NY (US)

(73) Assignees: ARIZONA BOARD OF REGENTS ON BEHALF OF THE UNIVERSITY OF ARIZONA, Tucson, AZ (US); THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

(21) Appl. No.: 15/780,865

(22) PCT Filed: Dec. 5, 2016

(86) PCT No.: PCT/US2016/064911
§ 371 (c)(1),
(2) Date: Jun. 1, 2018

(87) PCT Pub. No.: WO2017/096349
PCT Pub. Date: Jun. 8, 2017

(65) Prior Publication Data
US 2018/0287697 A1 Oct. 4, 2018

Related U.S. Application Data

(60) Provisional application No. 62/304,637, filed on Mar. 7, 2016, provisional application No. 62/262,882, filed on Dec. 3, 2015.

(51) Int. Cl.
*H04B 10/07* (2013.01)
*H04B 10/077* (2013.01)
(Continued)

(52) U.S. Cl.
CPC ...... *H04B 10/0775* (2013.01); *H04J 14/0256* (2013.01); *H04J 14/0267* (2013.01);
(Continued)

(58) Field of Classification Search
CPC . H04B 10/0775; H04B 10/07; H04Q 11/0062; H04Q 2011/0083; H04J 14/0267; H04J 14/0256; H04J 14/02
(Continued)

(56) References Cited

U.S. PATENT DOCUMENTS 5,995,687 A * 11/1999 White ............... G01M 11/3136
385/14
6,049,414 A 4/2000 Espindola et al.
(Continued)

FOREIGN PATENT DOCUMENTS

| CN | 1347224 | 5/2002 |
|---|---|---|
| CN | 101159493 | 4/2008 |
| EP | 0837575 A2 | 4/1998 |

OTHER PUBLICATIONS

Way et al, The Effect of Transient Gain Compression in a Saturated EDFA, Oct. 1994, IEEE, pp. 1200-1202. (Year: 1994).*
(Continued)

*Primary Examiner* — Dibson J Sanchez
(74) *Attorney, Agent, or Firm* — Stuart H. Mayer; Mayer & Williams PC

(57) ABSTRACT

A method of interrogating a WDM optical communication system is provided to obtain one or more performance parameters. In accordance with the method, an optical probe wavelength is generated and possibly modulated in a pre-
(Continued)

scribed manner. The probe signal is transmitted along a selected optical path through the WDM optical communication system for a duration of time that is less than a response time of network elements that impact signal quality along the selected optical path.

8 Claims, 4 Drawing Sheets

(51) Int. Cl.
*H04J 14/02* (2006.01)
*H04Q 11/00* (2006.01)

(52) U.S. Cl.
CPC ......... *H04Q 11/0062* (2013.01); *H04B 10/07* (2013.01); *H04J 14/02* (2013.01); *H04Q 2011/0083* (2013.01)

(58) Field of Classification Search
USPC .......................................... 398/9–38, 43–103
See application file for complete search history.

(56) References Cited

U.S. PATENT DOCUMENTS

| | | | |
|---|---|---|---|
| 6,122,044 A * | 9/2000 | Gautheron | H04B 10/07 356/73.1 |
| 6,147,796 A | 11/2000 | Ma et al. | |
| 6,212,001 B1 | 4/2001 | Bode et al. | |
| 6,222,652 B1 * | 4/2001 | Roberts | H04B 10/077 398/155 |
| 6,389,047 B1 * | 5/2002 | Fischer | H01S 3/067 372/102 |
| 6,771,904 B1 * | 8/2004 | Sasaki | H04B 10/0775 398/16 |
| 6,795,607 B1 * | 9/2004 | Archambault | H04B 10/0775 385/24 |
| 7,009,693 B2 * | 3/2006 | Takashina | H04B 10/071 356/73.1 |
| 7,110,671 B1 | 9/2006 | Islam | |
| 7,444,078 B1 * | 10/2008 | Stango | H04J 14/0217 359/334 |
| 7,711,266 B1 * | 5/2010 | Harris | H04B 10/2569 398/16 |
| 8,135,274 B2 * | 3/2012 | Zhang | H04B 10/035 398/31 |
| 8,639,069 B1 | 1/2014 | Helkey et al. | |
| 8,971,705 B2 * | 3/2015 | Boertjes | H04J 14/0221 398/38 |
| 9,065,565 B2 | 6/2015 | Martinelli et al. | |
| 9,306,664 B1 * | 4/2016 | Vusirikala | H04B 10/07953 |
| 10,142,016 B2 * | 11/2018 | Mattos | H04J 14/0227 |
| 10,298,321 B2 * | 5/2019 | Moeller | H04B 10/07953 |
| 2001/0012146 A1 * | 8/2001 | Shiozaki | H04B 10/296 359/337 |
| 2001/0038488 A1 | 11/2001 | Kinoshita | |
| 2002/0131099 A1 * | 9/2002 | Harasawa | H04B 10/0791 398/13 |
| 2002/0149812 A1 * | 10/2002 | Hong | H04J 14/02 398/79 |
| 2002/0181045 A1 | 12/2002 | Uda et al. | |
| 2003/0106990 A1 | 6/2003 | Tomofuji et al. | |
| 2003/0138250 A1 | 7/2003 | Glynn | |
| 2003/0227948 A1 | 12/2003 | Rice | |
| 2003/0231888 A1 * | 12/2003 | Takashina | H04B 10/079 398/149 |
| 2004/0096214 A1 * | 5/2004 | Morreale | H04B 10/0775 398/33 |
| 2004/0165888 A1 | 8/2004 | Gerstel et al. | |
| 2004/0190595 A1 | 9/2004 | Litvin | |
| 2004/0202472 A1 * | 10/2004 | Giles | H04J 14/0227 398/75 |
| 2004/0208430 A1 * | 10/2004 | Chin | H04B 10/0775 385/24 |
| 2005/0110980 A1 * | 5/2005 | Maehara | H04B 10/071 356/73.1 |
| 2005/0196175 A1 * | 9/2005 | Evangelides | H04B 10/0771 398/151 |
| 2005/0238355 A1 * | 10/2005 | Leite | H04Q 11/0062 398/58 |
| 2006/0023996 A1 * | 2/2006 | Nakagawa | H04J 14/0212 385/24 |
| 2006/0159464 A1 * | 7/2006 | Cornwell | H04B 10/071 398/169 |
| 2006/0193632 A1 | 8/2006 | Risbood | |
| 2007/0041006 A1 * | 2/2007 | Abbott | H04B 10/071 356/73.1 |
| 2007/0189767 A1 * | 8/2007 | Pfeiffer | H01S 3/06754 398/30 |
| 2008/0085115 A1 | 4/2008 | Turukhin et al. | |
| 2008/0199185 A1 * | 8/2008 | Miller | H04B 10/071 398/139 |
| 2009/0232499 A1 | 9/2009 | Sarashina et al. | |
| 2009/0304380 A1 | 12/2009 | Sadananda et al. | |
| 2010/0142943 A1 | 6/2010 | Frankel et al. | |
| 2010/0172646 A1 | 7/2010 | Colbourne | |
| 2010/0253936 A1 * | 10/2010 | Xia | G01M 11/333 356/73.1 |
| 2011/0205531 A1 * | 8/2011 | Ohtani | G01M 11/335 356/73.1 |
| 2011/0262143 A1 | 10/2011 | Ji et al. | |
| 2011/0268437 A1 * | 11/2011 | Kotrla | H04B 10/0775 398/16 |
| 2011/0274434 A1 | 11/2011 | Cunningham et al. | |
| 2011/0292497 A1 * | 12/2011 | Bolshtyansky | H01S 3/13013 359/334 |
| 2012/0057876 A1 * | 3/2012 | Liu | H04B 10/296 398/82 |
| 2012/0182023 A1 * | 7/2012 | Zhang | G01M 11/3109 324/501 |
| 2013/0148961 A1 | 6/2013 | Fujita et al. | |
| 2013/0156421 A1 * | 6/2013 | Bravi | G01M 11/332 398/29 |
| 2013/0195462 A1 | 8/2013 | Ghioni et al. | |
| 2013/0259466 A1 * | 10/2013 | Chen | G01M 11/3127 398/5 |
| 2013/0266316 A1 | 10/2013 | Xia et al. | |
| 2014/0003806 A1 * | 1/2014 | Urban | G01M 11/3136 398/21 |
| 2014/0016934 A1 | 1/2014 | Xu et al. | |
| 2014/0255026 A1 | 9/2014 | Roorda et al. | |
| 2015/0208146 A1 * | 7/2015 | Younce | H04Q 11/0066 398/21 |
| 2015/0381272 A1 * | 12/2015 | Nakamura | H04B 10/0775 398/16 |
| 2017/0223438 A1 | 8/2017 | Detwiler | |
| 2018/0069648 A1 * | 3/2018 | Inada | H04B 10/073 |
| 2019/0101419 A1 * | 4/2019 | Rowen | H01S 3/1086 |

OTHER PUBLICATIONS

Chen et al, Transient effect to small duty cycle pulse in cascaded erbium doped fiber amplifier, Feb. 2013, SPIE, All Document. (Year: 2013).*
Desurvire, Analysis of Transient Gain Saturation and Recovery in Erbium Doped Fiber Amplifiers, Aug. 1989, IEEE, All Document. (Year: 1989).*
Ko et al, Transient Analysis of Erbium-Doped Fiber Amplifiers, Dec. 1994, IEEE, All Document. (Year: 1994).*
Iida et al, High Sensitivity Coherent Optical Time Domain Reflectometry, Apr. 2012, JOLT vol. 30 No. 8, pages All Document. (Year :2012).*
Kani et al., "Energy-Efficient Optical Access Networks: Issues and Technologies" Topics in Optical Communications, IEEE Communications Magazine • Feb. 2013, pg. S22-S26.

* cited by examiner

FAST PROBING OF SIGNAL QUALITY IN A WDM NETWORK

CROSS-REFERENCE TO RELATED APPLICATIONS

This application claims the benefit of U.S. Provisional Application No. 62/262,882, filed Dec. 3, 2015 entitled "FAST PROBING OF SIGNAL QUALITY IN A WDM NETWORK" and U.S. Provisional Application No. 62/304,637, filed Mar. 7, 2016, entitled "FAST PROBING OF SIGNAL QUALITY IN A WDM NETWORK", the contents of which are incorporated herein by reference in their entirety.

This application is related to PCT Application No. PCT/US15/55466, filed Oct. 14, 2015 entitled "MULTI-WAVELENGTH BALANCED OPTICAL TRANSMISSION NETWORKS".

GOVERNMENT FUNDING

This invention was made with government support under Grant No. EEC0812072, awarded by NSF. The government has certain rights in the invention.

BACKGROUND

Optical transmission systems use optical wavelengths to transmit data from one location to another through an optical fiber. Amplifiers along the fiber path regenerate the signal powers between and at add drop nodes. Data signals or channels that are modulated on the optical wavelengths are introduced and removed from the transmission line at the add drop nodes. Data channels modulated onto different carrier frequencies or wavelengths can occupy the same fiber, creating a wavelength division multiplexed (WDM) system. Optical add drop nodes can add and remove signals without blocking the other signals passing through the nodes—these are sometimes referred to as transparent optical add drop nodes.

In a reconfigurable optical add drop multiplexing (ROADM) node, multiple fibers in and out of the node can be supported and the different channels can be selectively added or dropped or sent to different fibers based on the setting of an optical switch in the node. For a so called colored optical add drop node, the transceivers that generate the optical signals are connected to a port that only accepts signals of a particular wavelength or set of wavelengths. Thus the signal wavelength and wavelength band, although it may initially be tuned to match that fixed input wavelength, becomes rigidly set in place. This approach has been widely used in the past, largely due to cost considerations. Recently, colorless node techniques have been introduced. The optical ports for this type of node can be any wavelength or set of wavelengths.

Conventional systems have been described in which a data channel that has been set to one optical wavelength is moved to a new optical wavelength in order to accommodate a new routing plan or network failure, for example. Changing the network configuration in this way, however, often has to be performed very slowly in order to avoid disrupting other channels. This is because the channels interact through the amplifiers and the nonlinear characteristics of the optical fiber. Furthermore, in normal operation these optical signals need to be repeatedly tuned and carefully adjusted in power as the properties of the fiber, amplifiers, and other components drift over time. When new signals are added to the network or any similar changes made, the adjustments need to likewise be done slowly and carefully. When a fiber break occurs the signals often experience power excursions that persist over long periods of time until the system controls can be adjusted to compensate and find the new operating points.

When a new data signal or channel is added to a ROADM-based or similar optically switched network, or when the wavelength path of a signal is changed, a careful procedure is typically followed. This involves first determining whether the new channel or reconfigured channel will be able to be provisioned along the new path. Usually off-line performance estimation software (sometimes called a path computation element or estimator) is used to estimate what will happen and whether the provisioning will be successful, (i.e. stable and error free) once provisioned without affecting any other channels in the network. When the new channel or path is provisioned, components are tuned in a systematic way to avoid disturbing existing channels in the network and to optimize the transmission performance of the new signal or path. This can take many minutes. Once provisioned it is possible that the signal will not be error free. This can happen because the performance estimator did not have complete information or is not able to handle all possible configurations. Often information about the fiber plant and the physical network is faulty e.g., losses might be higher than reported, etc. If the received signal turns out to have errors, then it needs to be removed and a new path set up, which requires more time, resources, and the potential for disturbing other signals. Furthermore, to minimize the likelihood of this occurring, the estimators use engineering margins, which are generally conservative estimations of the parameter values or the estimated performance. Increasing the margins increases the reliability of the estimations, but results in inefficiencies since many channel paths that might be fine will be rejected due to overly conservative estimations. When a signal path is rejected, then a more conservative path might be chosen, which requires more signal regeneration and thus more hardware, increasing cost and energy use.

Agile optical networking, where optical channels and channel capacity are provisioned in real-time (rather than being pre-provisioned) in accordance to traffic demand, the traffic being automatically switched at various intermediate nodes, is a promising approach for next-generation networks. Agile optical networks need to support rapidly changing traffic patterns by continuously adapting wavelength assignments for optimum resource utilization. However, such network agility entails rapid wavelength reconfiguration, which, as discussed above, can be difficult to accomplish. A primary obstacle to rapid wavelength reconfiguration is the debilitating channel power fluctuations that would arise and propagate through the network due to the changing loading conditions in automatic gain controlled (AGC) optically amplified systems. Conventional networks avoid this problem by using long reconfiguration times which are accompanied by significant data loss.

A promising method for rapid wavelength reconfiguration is hop-tuning which utilizes receivers that automatically detect and adapt to any change in the transmitter frequency at fast time scales (less than e.g., 1 µs). Using hop tuning, the spectral location of a channel can be changed without affecting the spectral distribution of the other channels in the network. However, the remaining channels may still be adversely affected by the resulting optical power dynamics; this is an issue that recent work on dynamic networking technologies either do not address or assumes will be solved.

Thus, it is important to develop techniques that enable rapid wavelength reconfiguration with minimal data loss while maintaining network stability.

SUMMARY

In accordance with one aspect of the subject matter described herein, rapid wavelength reconfiguration can be achieved by leveraging the time-dependent response of network elements such as optical amplifiers. For instance, Erbium-Doped-Fiber-Amplifiers (EDFA) have long time constants, on the order of hundreds of microseconds. The amplifier is unable to temporally resolve any repetitive power fluctuations occurring faster than its response time and averages these power fluctuations. For example, when a fast-tunable laser switches continuously between two wavelengths at time scales faster than the amplifier time constant, they are perceived as two static wavelengths by the optical amplifier. Thus, a transient response that is faster than the amplifier time constant will not be detected as a change in loading conditions and consequently, the wavelengths experience no transient effects. This time dependent response property of optical amplifiers or other network elements is leveraged to achieve rapid wavelength reconfiguration capabilities by using lasers that switch faster than the time constants of the network elements In accordance with one particular embodiment, a method of interrogating a WDM optical communication system is provided to obtain one or more performance parameters. In accordance with the method, an optical probe wavelength is generated and possibly modulated in a prescribed manner. The probe signal is transmitted along a selected optical path through the WDM optical communication system for a duration of time that is less than a response time of network elements that impact signal quality along the selected optical path.

DETAILED DESCRIPTION

Figure 1:
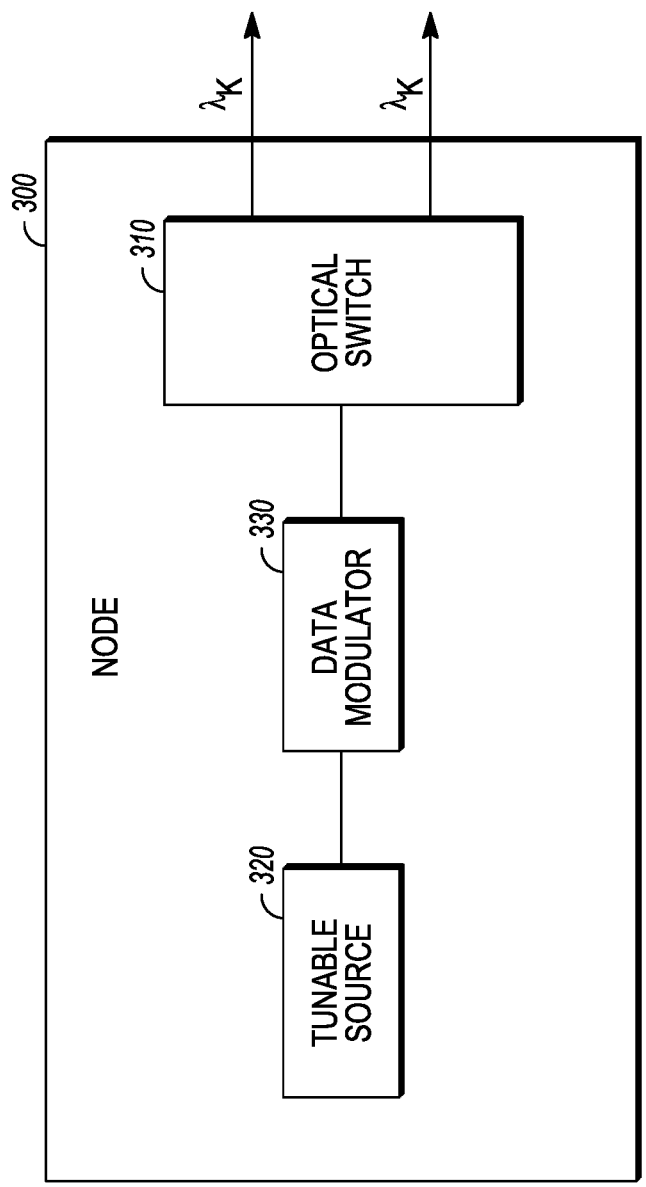
FIG. 1 shows one example of a network node that includes a tunable source that is modulated to create an optical signal that is introduced to an optical network.

As described in more detail below, a technique is introduced to improve the accuracy and speed of provisioning a new data channel at a selected optical wavelength or moving an existing data channel from one optical wavelength on which it is currently deployed to another optical wavelength and/or path through the network. In some implementations a fast tunable laser may be used as the optical source for generating the optical wavelengths. The laser can then be moved to a new wavelength very rapidly and for a short time (specified below) before returning to its original wavelength. This rapid switching is used to set up a brief probe signal that will follow the new path to be provisioned. By switching rapidly, the normal system controls do not detect or respond to the brief probe signal. In this way the system is left unperturbed. Furthermore, additional resources in the form of transceivers or lasers are not needed for the probe signal, since an existing optical wavelength that is currently supporting a data channel may be 'borrowed' for a short period of time and only experiences a brief pause in its transmission that likewise is undetected by the system controls. The probe signal itself can be unmodulated (i.e., it can be a cw signal) or it can be modulated with various known data patterns to test for different performance parameters like dispersion, transmission distance, wavelength dependent loss, etc.

While it will often be convenient to generate the wavelength for the probe signal with a tunable laser, in some implementations a laser operating at a fixed wavelength or may be employed instead. The wavelength generated by the fixed wavelength laser may be directed to a switch that causes the probe wavelength to be directed onto the selected path for the short period of time specified below. This fixed wavelength laser may also be a slowly tunable laser that can be moved to different wavelengths and then fixed in place while the probing operation is conducted.

A high speed detector may be used to pick up the probe signal at any node along the path. In some implementations the detector may be incorporated into the optical amplifiers located along the path to obtain finer granularity information (the probe signal will need to be filtered from the other signals before reaching the detector). Once the probe is measured, that information can then be used to adjust or otherwise set the system controls along the path to provide the most rapid setup of the new path, avoid impacting other channels, or reject the path.

The response times of most amplifiers and other system controls are typically a microsecond or longer. Therefore, the probe signal may be applied along a new path for a shorter period of time, e.g., 100 ns. Although the probe signal may be applied at the full optical signal power to the amplifiers and other system controls, the power will appear to be only 1/10 or less of the full power (assuming the duration of the probe signal is 100 ns). This is because these elements will integrate the signal power over their respective response times. Detectors along the path and at the receive point with a response time of less than 100 ns will detect the full power of the probe signal. This information can then be used to determine the signal performance, for example the path losses and/or chromatic dispersion. This information can then be used to tune the various network elements such as the attenuator settings on the wavelength selective switches used in the ROADM nodes, the amplifier gains and tilts, and the electronic dispersion compensating filters at the receiver. Once the settings are determined, the new optical signal can be fully switched onto the path, either by moving the optical signal from an existing path or by establishing a new path. This technique can also be used for switching more than one signal.

Note that the optical wavelength(s) used for the probe signal(s) can be wavelength(s) that are currently supporting data channels which are not to be switched to another wavelength. Alternatively, the optical wavelengths used for the probe signal(s) may be wavelength(s) currently supporting data channels that are to be switched to new wavelengths. For example, if the data channel to be switched is initially off or occupying a completely different path, the probe signal may use an optical wavelength supporting another data channel that is already traversing the path of interest.

In one implementation, the measured information is used to determine an algorithm for provisioning the new path and/or data channels to minimize disruption of existing traffic. For example, if the new path is determined to include links that are susceptible to disruptions when the new optical signal is switched on, then the optical signal might be applied to those links in steps of increasing power by adjusting the attenuators in the switch immediately prior to the susceptible links.

FIG. 1 shows one example of a network node 300 that includes a tunable source 320 that is modulated to create an optical signal that is introduced to an optical network. The optical switch 310 in the node is configured to send wavelength $\lambda_j$ to the existing path and wavelength $\lambda_k$ to the new path. The tunable source 320 briefly tunes to wavelength $\lambda_k$ in order to send a probe signal onto the new path. Signal monitors along the new path measure the probe signal and use it to tune elements along the links, in the nodes, and at the transmitter or receiver in order to prepare for the switching event. The new signal is then introduced to the new path either by tuning the tunable source permanently to the wavelength $\lambda_k$ or by introducing a new signal with a different source that is tuned to wavelength $\lambda_k$ at that node. The average power of the probe signal is seen by network elements such as optical amplifiers to be very small because it is only applied for a duration that is shorter than the response time of the network elements.

In some embodiments, optical switch 310 may be an optical crossconnect or an optical add/drop multiplexer (OADM), for example. In one embodiment the optical switch employs an OADM that is reconfigurable, i.e., the optical switch is a reconfigurable OADM (ROADM). The tunable optical source 320 may be a tunable laser (e.g., a Distributed Feedback (DFB) laser, an External-Cavity Laser (ECL), a Sampled Grating Distributed Bragg Reflector (SGDBR) laser, etc.) to generate the optical wavelengths onto which data is to be modulated. Data modulator 330 modulates the individual wavelengths with the data. Data modulator 330 may employ any suitable modulation format. For example, modulation may be imparted in terms of a constellation (e.g., binary, quaternary, 8-ary, 16-ary, higher order constellations, etc.) using any manner of modulation (e.g. intensity, phase, frequency, polarization). An illustrative optical modulator that may be employed is a Mach-Zehnder modulator, for example.

In one implementation the probe wavelength is a wavelength at which a data channel is to be switched from one wavelength to another. After adjusting the settings of various network elements such as optical amplifiers and the like based on the information obtained from the probe signal, the data channel undergoes a gradual transition during which it is switched from the original wavelength to the new wavelength. In one case, this transition is performed by gradually increasing the power of the new wavelength while reducing the power of the original wavelength over the transition period such that the data channel is simultaneously provisioned on both wavelengths during the transition period. In another case, the transition is performed by gradually increasing the duty cycle of the new wavelength while reducing the duty cycle of the original wavelength over the transition period such that the data channel is simultaneously provisioned on both wavelengths during the transition period. One advantage that arises from varying the duty cycle instead of the power during the transition period is that the signal is always at full power and thus can carry live data during the transition, thereby reducing the time over which data needs to be buffered or sent somewhere else to prevent it from being lost.

The functionality of the node will determine the choice of wavelength(s) that may be used for the probe signal(s) and the path(s) along which the probe signal may be sent. For instance, a node that incorporates a colorless ROADM will enable the probe signal to be tuned to any wavelength allowed by the system. Likewise, a node that employs a directionless ROADM will enable the probe signal to be transmitted from any output port of the node. In general, a node that is fully or partially directionless and/or colorless will enable the probe signal to have the corresponding degree of flexibility that is offered by that node. The node will include the laser source that generates the probe wavelength. Depending on availability, the laser source may be a spare or idle transceiver located within the node. Alternatively, a dedicated laser source (tunable or fixed) may be employed to generate the probe wavelength(s) at the monitoring location(s).

In one implementation the wavelength used to support the probe signal may be configured to "loop back" on itself, following the same path but on a different fiber to return it to the transceiver generating the probe signal. In this way only one transceiver is needed to monitor the probe signal, end to end. The loopback path may be set up at any node along the path to be probed, thereby isolating the measurement to that portion of the path between the transceiver and the loopback.

In one implementation, instead of using the probe signal to provision a data channel, the probe signal may be generated for the purpose of detecting and measuring faulty conditions within the network. Using loop backs or monitors located along the path, the location of faults can be isolated. The types of faults that may be detected can arise from many different failure mechanisms, but of particular interest are faults that are not detected with conventional alarms. Such faults may be related, for instance, to signal performance. For example if a filtering device drifts due to faulty thermal control it may distort the signal, but otherwise not cause any other impairments. Measurements of the bit error ratio of the probe signal along the path can isolate the location. Optical performance monitors that are sensitive to signal distortion could likewise identify the magnitude and location of the distortion using the probe signal.

In another implementation, a probe signal is used to test different paths within the network in order to determine which path is most suitable for moving one or more existing data channels to new spectral locations in order to defragment the network. Fragmentation occurs when wavelength paths are blocked due to an existing data channel being present at a particular wavelength in a portion of the path, thereby blocking the use of that wavelength along the full path. Two or more data channels that do not occupy the same path may be tuned to the same wavelength, freeing up more spectrum that can support new data channels. The process of freeing up spectrum in this manner is referred to as defragmentation, which is similar to the way that memory blocks are defragmented in computer storage systems.

In yet another implementation, a fast tunable laser is rapidly tuned to multiple wavelengths to create multiple probe signals. These multiple probe signals can then be used to either introduce or switch multiple data channels to different wavelengths. Multiple probe signals may also be used to select the best performing path from among several different paths. Best performing can refer to the transmission performance, e.g., bit error rate, or to other parameters such as the path that causes the least disruption to other channels or the path that can be provisioned the most rapidly.

The probe signal may be monitored by hardware located along the path of the optical probe signal and/or at its receive location in order to filter out and/or measure the probe signal. The hardware may be, for example, a conventional receiver or a burst mode receiver. At a node such as a ROADM-based node, this hardware may be provided by an existing tunable transceiver that is set to receive the probe wavelength. If the receiver is a coherent receiver system, the probe signal may be detected by rapidly tuning the local oscillator of the receiver to the probe wavelength. Alternatively, a fast tunable filter or wavelength selective switch can be used to select the probe signal. Instead of a fast filter or switch, an extra transceiver may be used which is tuned to the probe wavelength. If an optical signal is to be provisioned at a wavelength that is currently unused, then the transceiver used to monitor the probe signal could be the same transceiver that is to provide the wavelength at which the optical signal is to be provisioned.

Figure 2:
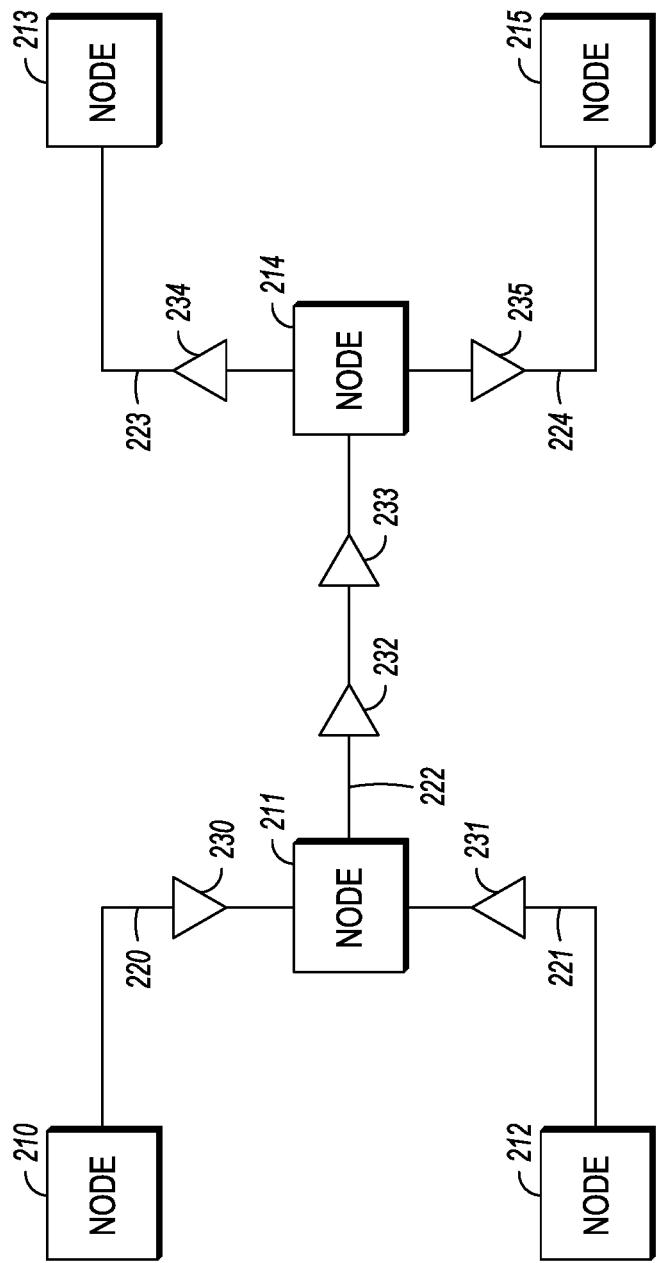
FIG. 2 shows one example of a WDM transmission network that may incorporate the methods, techniques and systems described herein.

FIG. 2 shows one example of a WDM transmission network 200 that may incorporate the methods, techniques and systems described herein. WDM transmission network 200 includes network nodes 210-215. Each node is connected to at least one other node by optical links 220-224, which may comprise optical fibers through which the WDM signals propagate. For example, node 210 is connected to node 211 by link 220, and node 211 is connected to node 212 by link 221. In addition, node 211 is connected to node 214 by link 222, and node 214 is connected to node 213 by link 223. Further, node 214 is connected to node 215 by link 224. The links may each comprise at least two optical fibers that carry optical signals traveling in opposite directions to provide bidirectional communication. Capacity in any link can be increased by increasing the number of fiber pairs that are provided. Each link may include one or more optical amplifiers 230-235 for amplifying the WDM signals. For example, links 220, 221, 223 and 224 respectively include optical amplifiers 230, 231, 234 and 235. Likewise, link 222 includes optical amplifiers 232 and 233. Information is transmitted and received over WDM transmission network 200 by modulation of one or more optical wavelengths to encode data onto the wavelengths. The various modulated optical wavelengths are combined into a single WDM signal that is transmitted over transmission links.

WDM transmission network may comprise a point-to-point optical network with terminal nodes, a ring optical network, a mesh optical network, or any other suitable optical network or combination of optical networks. The number of nodes and optical links shown in FIG. 2 is exemplary and provided for simplicity of illustration. The network nodes 210-215, which may employ fixed or reconfigurable optical add/drop modules, may be in some implementations colorless and/or directionless.

Optical amplifiers 230-235 may be any suitable type of all-optical amplifier (i.e, an amplifier without any optical to electrical conversion). For example, optical amplifiers may be rare-earth doped optical amplifiers such as erbium doped optical amplifiers or Raman optical amplifiers. The optical amplifiers employed in any given transmission network may all be of the same type or different types.

In some implementations, the techniques described herein may be employed in an agile optical network in which optical channel capacity can be provisioned in real-time in accordance to traffic demand. Such networks may employ a reconfigurable optical add drop multiplexing (ROADM) node, which, as previously mentioned, allows different channels to be selectively added or dropped or sent to different fibers based on the setting of the optical switch in the node. One example of a ROADM node that may provision a new data channel or switch an existing channel in accordance with techniques described herein is shown in FIG. 3.

Figure 3:
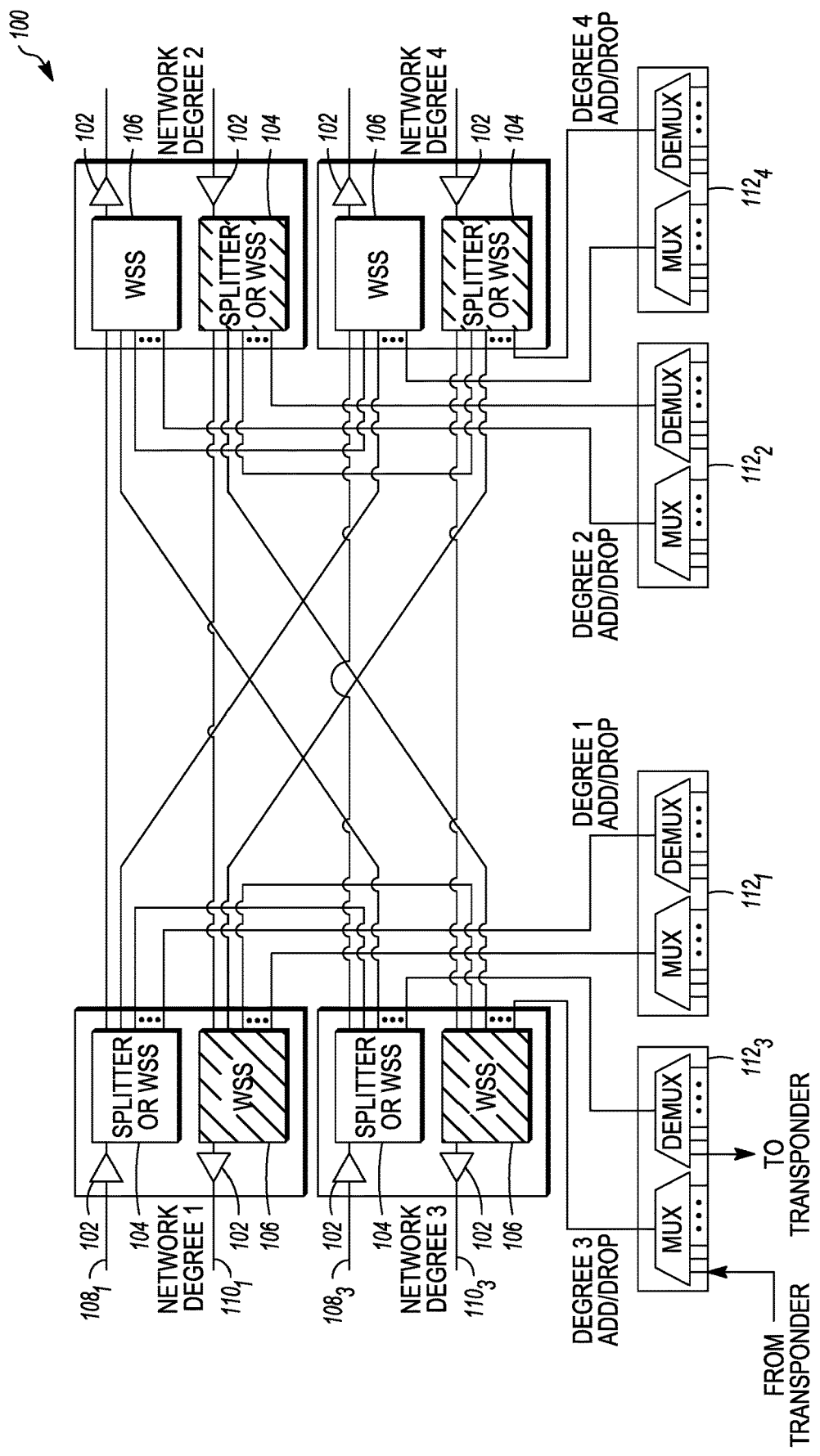
FIG. 3 shows one example of a ROADM node that may provision a new data channel or switch an existing channel in accordance with techniques described herein.

The ROADM 100 shown in FIG. 3 may be colorless (e.g., allowing any wavelength to directed to any add/drop port), directionless (e.g., allowing any wavelength to be sent to any degree), contentionless (e.g., allowing any combination of wavelengths to be directed to any degree from any port), and/or a gridless (e.g. no fixed frequency required) architecture. ROADM 100 may support any portion of the optical spectrum provided by the optical network, any channel bit rate, and/or any modulation format. In the example shown in FIG. 3 the ROADM is multi-degree and has a colorless architecture. Each network degree is coupled to a pair of optical amplifiers 102, with an input connected to a 1×N optical fan-in device, e.g., a power splitter (PS) or wavelength selective switch (WSS) 104), and an output connected to a N×1 optical fan-out device, i.e., WSS 106. Multiplexed optical signals on input port $108_1$ from network degree 1 are selectively directed via PS/WSS 104 to WSSs 106 and associated output ports $110_2$, $110_3$ and/or $110_4$ for network degrees 2, 3 and/or 4, respectively. In the same manner, multiplexed optical signals on input ports $108_2$, $108_3$ and $108_4$ (network degrees 2, 3 and 4) may be similarly routed to the other network degrees of the system. The input ports 108 and output ports 110 serve as the line ports of the optical system node 100. A plurality of multiplexer/demultiplexer assemblies $112_1$, $112_2$, $112_3$, and $112_4$ are connected to the WSSs 106 and PS/WSSs 104 for locally adding/dropping wavelengths from client side ports to/from each network degree 1, 2, 3 and 4 by WSSs 106 and PC/WSSs 104.

Figure 4:
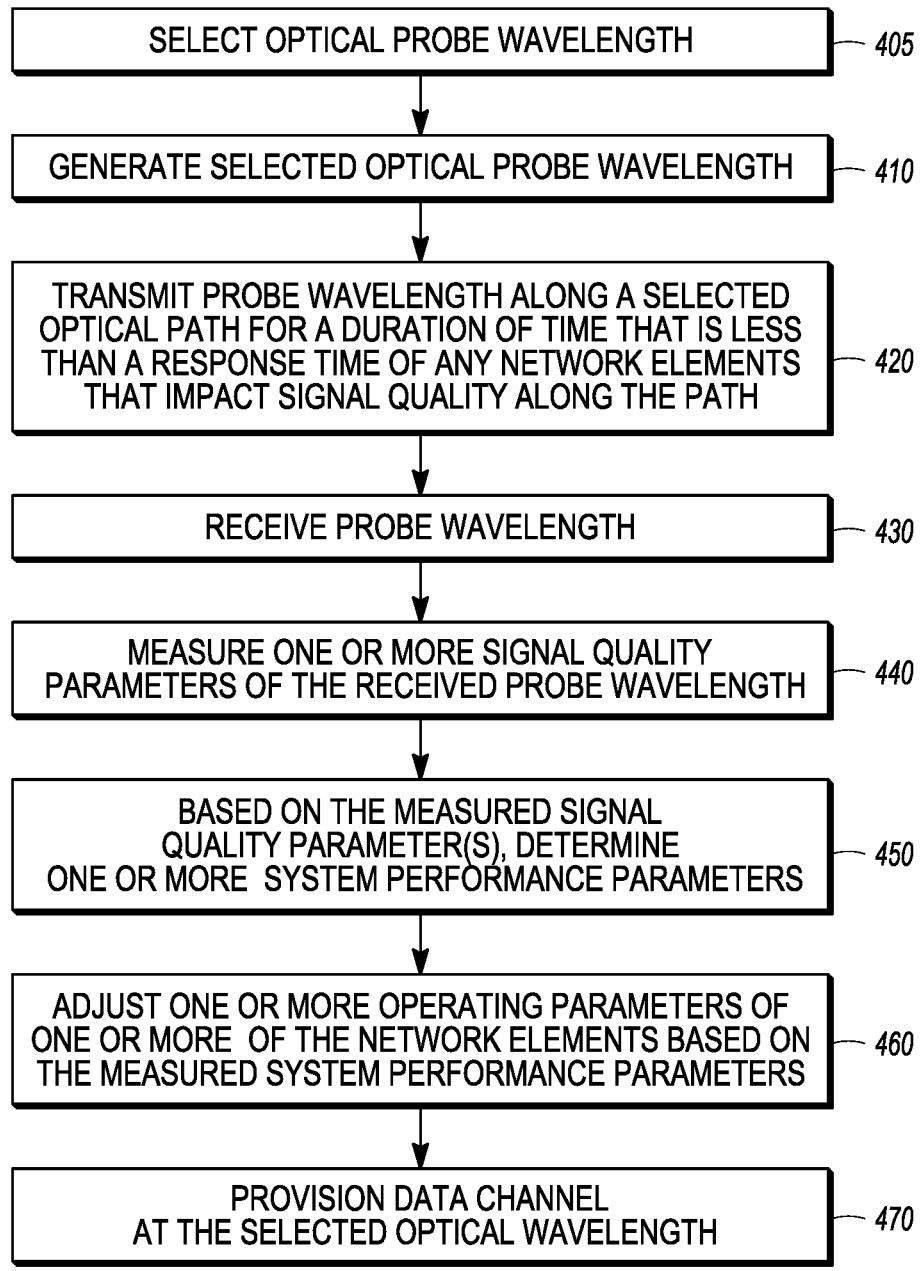
FIG. 4 is a flowchart showing one example of a method for provisioning a data channel on an optical wavelength in a WDM optical communication system.

FIG. 4 is a flowchart showing one example of a method for provisioning a data channel on an optical wavelength in a WDM optical communication system. The method begins at block 405 when an optical probe wavelength is selected. The selected wavelength may be used to provision a new data channel in the system or to switch an existing data channel onto a new optical wavelength. The selected optical probe wavelength is generated at block 410. The optical probe wavelength may be modulated in some suitable manner or, alternatively, it may be a CW probe. The probe wavelength is transmitted along a selected optical path through the WDM optical communication system at block 420 for a duration of time that is less than a response time of any network elements that impact signal quality along the selected optical path. The probe wavelength is received at block 430 and at block 440 one or more signal quality parameters of the received probe wavelength are measured. Illustrative parameters that may be measured include, without limitation, attenuation settings, optical amplifier gain, optical amplifier gain tilt, and/or dispersion compensation filter settings. Based on the measured signal quality parameter(s), one or more system performance parameters characterizing the selected optical path is determined at block 450. Next, at block 460 one or more operating parameters of one or more of the network elements is adjusted based on the one or more system performance parameters. Finally, at block 470, the data channel is provisioned at the selected optical wavelength.

Although the subject matter has been described in language specific to structural features and/or methodological acts, it is to be understood that the subject matter defined in the appended claims is not necessarily limited to the specific features or acts described above. Rather, the specific features and acts described are disclosed as example forms of implementing the claims.

The invention claimed is:

1. A method of interrogating a WDM optical communication system to obtain one or more performance parameters, comprising:
   generating an optical probe wavelength, wherein generating the optical probe wavelength includes selecting as the probe wavelength a first optical wavelength at which a data channel is to be provisioned;
   modulating the probe wavelength in a prescribed manner to produce a probe signal; and
   while at least one data channel is currently deployed in the WDM system, transmitting the probe signal along a selected optical path through the WDM optical communication system for a duration of time that is less than a response time of network elements that impact signal quality along the selected optical path;
   receiving the probe signal after it traverses the selected optical path;
   measuring one or more signal quality parameters of the received probe signal; and
   based on the measured signal quality parameters, determining one or more system performance parameters characterizing the selected optical path;
   and
   adjusting one or more operating parameters of one or more of the network elements based on the one or more operating parameters, wherein the data channel to be provisioned is provisioned on a second wavelength prior to adjusting the one or more operating parameters, and further wherein provisioning the data channel at the first wavelength includes gradually increasing a power of the first wavelength while reducing a power of the second wavelength over a transition period of time such that the data channel is simultaneously provisioned on both the first and second wavelengths during the transition period.

2. The method of claim 1, wherein at least one of the operating parameters is selected from the group consisting of attenuation settings, optical amplifier gain, optical amplifier gain tilt, and dispersion compensation filter settings.

3. The method of claim 1, further comprising:
   provisioning the data channel at the first optical wavelength along the selected optical path after the adjustments.

4. A method of interrogating a WDM optical communication system to obtain one or more performance parameters, comprising:
   generating an optical probe wavelength;
   modulating the probe wavelength in a prescribed manner to produce a probe signal;
   while at least one data channel is currently deployed in the WDM system, transmitting the probe signal along a selected optical path through the WDM optical communication system for a duration of time that is less than a response time of network elements that impact signal quality along the selected optical path;
   wherein generating the optical probe wavelength includes generating the optical probe wavelength with a tunable laser that is tuned to a first optical wavelength that is deployed in the WDM optical communication system to support an existing data channel and further comprising:
   switching the tunable laser to generate the optical probe wavelength for said duration of time; and
   after expiration of said duration of time, re-tuning the tunable laser back to the first optical wavelength.

5. A method of interrogating a WDM optical communication system to obtain one or more performance parameters, comprising:
   generating an optical probe wavelength, wherein generating the optical probe wavelength includes selecting as the probe wavelength a first optical wavelength at which a data channel is to be provisioned;
   modulating the probe wavelength in a prescribed manner to produce a probe signal; and
   while at least one data channel is currently deployed in the WDM system, transmitting the probe signal along a selected optical path through the WDM optical communication system for a duration of time that is less than a response time of network elements that impact signal quality along the selected optical path;
   receiving the probe signal after it traverses the selected optical path;
   measuring one or more signal quality parameters of the received probe signal; and
   based on the measured signal quality parameters, determining one or more system performance parameters characterizing the selected optical path;
   adjusting one or more operating parameters of one or more of the network elements based on the one or more operating parameters, wherein the data channel to be provisioned is provisioned on a second wavelength prior to adjusting the one or more operating parameters, and further wherein provisioning the data channel at the first wavelength includes gradually increasing the duty cycle of the first wavelength while reducing the duty cycle of the second wavelength over a transition period of time such that the data channel is simultaneously provisioned on both the first and second wavelengths during the transition period.

6. A method of interrogating a WDM optical communication system to obtain one or more performance parameters, comprising:
   generating an optical probe wavelength;
   while at least one data channel is currently deployed in the WDM system, transmitting the probe wavelength along a selected optical path through the WDM optical communication system for a duration of time that is less than a response time of network elements that impact signal quality along the selected optical path;
   receiving the probe wavelength after it traverses the selected optical path;
   measuring one or more signal quality parameters of the received probe wavelength; and
   based on the measured signal quality parameters, determining one or more system performance parameters characterizing the selected optical path,
   adjusting one or more operating parameters of one or more of the network elements based on the one or more system performance parameters,
   wherein generating the optical probe wavelength includes selecting as the probe wavelength a first optical wavelength at which a data channel is to be provisioned and wherein the data channel to be provisioned is provisioned on a second wavelength prior to adjusting the one or more operating parameters, and further wherein provisioning the data channel at the first wavelength includes gradually increasing a power of the first wavelength while reducing a power of the second wavelength over a transition period of time such that the data channel is simultaneously provisioned on both the first and second wavelengths during the transition period.

7. The method of claim 6, wherein at least one of the operating parameters is selected from the group consisting of attenuation settings, optical amplifier gain, optical amplifier gain tilt, and dispersion compensation filter settings.

8. The method of claim 6, further comprising:
provisioning the data channel at the first optical wavelength along the selected optical path after the adjustments.

* * * * *